United States Patent Office 2,877,251
Patented Mar. 10, 1959

2,877,251

ALIPHATIC AND AROMATIC PHOSPHORUS-MERCURY COMPOUNDS AND METHOD OF PREPARING SAME

Robert B. Fox and David L. Venezky, Washington, D. C., assignors to the United States of America as represented by the Secretary of the Navy No Drawing. Application June 8, 1954
Serial No. 435,380

12 Claims. (Cl. 260—431)

(Granted under Title 35, U. S. Code (1952), sec. 266)

The invention described herein may be manufactured and used by or for the Government of the United States of America for governmental purposes without the payment of any royalties thereon or therefor.

The present invention relates to a new class of organometallic compounds, more particularly to new organic phosphorus-mercury derivatives, and to a method of preparing the same.

The new compounds of the invention are characterized by the presence in the molecule of a new bond, the phosphorus-mercury bond, and are aliphatic and aromatic phosphinylmercuric salts of the general formula $$(RO)_2P(O)HgX$$

wherein R is a hydrocarbon radical or a substituted hydrocarbon radical in which the substituents may be alkoxy, aryloxy, carbalkoxy, nitro, alkylamino, arylamino, sulfo or halogen groups, for example, methoxy, ethoxy, phenoxy, carbethoxy, methylamino, anilino, chlorine, bromine, etc., and X is a lower alkylcarboxylic acid radical having up to 8 carbon atoms or an inorganic salt-forming radical. The new compounds have fungicidal activity.

The new phosphorus-mercury derivatives can be prepared by reaction between equivalent proportions of the corresponding aliphatic or aromatic phosphonate, on the one hand, and of a lower alkyl mercuric carboxylate having up to 8 carbon atoms or of a mixture of an inorganic mercuric salt and mercuric oxide, on the other, and most probably involves replacement of the hydrogen atom on the phosphorus atom of the phosphonate by a monovalent mercury-containing group.

Among the phosphonates which may be employed as starting materials for the preparation of the new compounds are, for example, dimethyl-, diethyl-, bis(2-chloroethyl)-, ethylbutyl-, bis(3-diethylaminopropyl)-, bis(1-carbethoxyethyl)-, di-n-octyl-, dilauryl-, dioleyl-, distearyl-diphenyl-, ditolyl-, bis(p-nitrophenyl)-, bis(p-sulfophenyl)-, dibenzyl- and dicyclohexyl phosphonate, etc. The mercuric salt may be, for example, mercuric acetate, -propionate, -butyrate, -isobutyrate, -caprate, -caprylate, etc.; mercuric chloride, -bromide, -thiocyanate, -nitrate, -phosphate, etc.

The reaction between the phosphonate and the mercuric carboxylate, for example, mercuric acetate, takes place quite readily and is exothermic. It can be initiated by bringing the reactants together at room temperature, with cooling applied to control the reaction temperature. Preferably, although not necessarily, the reaction is conducted in the presence of a liquid organic diluent which forms an azeotrope with the carboxylic acid formed in the reaction whereby this acid can be removed from the reaction mixture by azeotropic distillation. Desirably, also, the organic diluent is a solvent for at least one of the reactants.

Conversion of the new phosphinylmercuric acetates to the corresponding phosphinylmercuric inorganic salts can be readily accomplished by conventional methods using the appropriate alkali metal salt. However, we have found that the new inorganic salts are to be obtained in higher yield and greater purity by proceeding directly from the phosphonates through reaction with a mixture of the mercuric salt and mercuric oxide, the over-all course of which reaction, as illustrated by reference to the preparation of the new halides, is:

$$2(RO)_2P(O)H + HgX_2 + HgO \rightarrow 2(RO)_2P(O)HgX + H_2O$$

wherein R is as above and X is halogen. This reaction involves the formation of water as an end-product in place of the acid normally to be formed from the starting mercuric salt, an effect apparently due to the presence of the mercuric oxide in the reaction. Preferably, a liquid organic diluent is used in the reaction which forms an azeotrope with the formed water whereby the latter can be removed from the reaction mixture by azeotropic distillation. The use of a solid drying agent in place of azeotropic distillation is less satisfactory. Here, also, it is desirable to use an organic diluent which is also a solvent for at least one of the reactants. In most cases, reaction will be found to be complete when the orange color of the mercuric oxide is discharged and the rapidity of this color discharge indicates to some extent the relative ease of reaction. In the case of the halides, it should be observed that although the red mercuric iodide color disappears immediately, the orange oxide color is never completely discharged.

Generally, the chlorides and bromides of the new compounds are more stable to heat and alkali than the acetates. The iodides tend to decompose to an unidentified amorphous yellow material, even on standing in a dry atmosphere at room temperature, although they can be stored in the cold. Decomposition is more pronounced in the presence of traces of impurities. Both diethoxyphosphinylmercuric acetate and chloride can be recrystallized from water without apparent hydrolysis. A general characteristic of the new compounds is a relatively high solubility in organic solvents. Most of them may be readily recrystallized from hexane.

The invention is further illustrated by the following specific examples of the preparation of certain of the new compounds.

EXAMPLE 1

To a vigorously stirred suspension of 350.5 g. (1.1 mols) of mercuric acetate in 500 ml. of dry toluene at room temperature was added 138 g. (1.0 mol) of diethyl phosphonate. The mixture was stirred for 2½ hours with the temperature maintained at 25° C. by means of an ice bath. Filtration of the reaction mixture gave 3 g. of insoluble material. The filtrate containing the product was distilled at 60 mm. pressure to remove the formed acetic acid as the toluene azeotrope until the take-off temperature was 36° C. and 175 ml. of distillate was collected. Distillation at higher temperatures resulted in formation of considerable amounts of free mercury. The distillate was filtered and after evaporation of the solvent gave a yield of 83.3% or 330 g. of the crude product. Recrystallization from toluene or benzene-ether mixture gave pure diethoxyphosphinylmercuric acetate of M. P. 106.8–107.6° C.

Solutions of the pure acetate product may be heated to 60° C. without deposition of free mercury. The acetate is soluble in alcohol, acetone, acetic acid, benzene and chloroform; moderately soluble in toluene and water, and almost insoluble in ether and petroleum hydrocarbons. Cryoscopic molecular weight determinations indicate the acetate to be monomeric in acetic acid and tetrameric in benzene.

Following the procedure of Example 1 but using ethylbenzene or n-octane as the solvent, the following dialkoxyphosphinylmercuric acetates of the formula $(RO)_2P(O)HgOOCCH_3$, were prepared: di-n-propoxy-, M. P. 86.3–87.2° C.; di-isopropxy-, M. P. 146.2–146.8° C.; di-n-butoxy-, M. P. 80.5–81° C.; di-isobutoxy-, M. P. 116–116.6° C.; di-n-pentoxy-, M. P. 72.5–73.5° C.; di-n-hexoxy-, M. P. 73.9–74.6° C. and di-n-heptoxy-, M. P. 83.2–84° C. In the preparation of these compounds, the acetic acid was usually removed as the azeotrope by distilling at 40–50° C. under 40 mm. pressure. n-Octane is particularly well suited to the procedure for this preparation, since the products are readily recrystallized from the hot solvent and are more stable to heat than the diethyl derivative. The azeotrope contains about 50% acetic acid at the working pressures. It is to be noted that it is necessary to remove as much acetic acid as possible since the crude acetates are very soluble in the acid.

The various other phosphinylmercuric carboxylates as defined herein can be made following the above described procedure with the use of a suitable organic solvent diluent.

EXAMPLE 2

The acetate of Example 1 was also prepared by reacting equimolar amounts of the dialkylphosphonate and mercuric acetate without the presence of a solvent. On mixing .05 mol of each of these materials at room temperature, a rapid temperature rise to 82° C. took place along with formation of a gray sludge of free mercury. The reaction mixture was taken up in benzene, filtered, and the filtrate added to a large quantity of hexane to precipitate the product. The yield of crude diethoxyphosphinylmercuric acetate was 78.6%, but the product was considerably less pure than that obtained under the method of Example 1.

Preparation of the phosphinylmercuric inorganic salts of the invention by metathesis from the corresponding phosphinylmercuric acetates and the appropriate alkali metal salt is illustrated by the following preparations. Water is used as the solvent for those of the starting acetates which are water-soluble and acetone or other appropriate organic solvent for those which are not.

EXAMPLE 3

A solution of 0.74 g. (.01 mol) of potassium choride in 25 ml. of water was added to a solution 3.69 g. (.01 mol) of diethoxy-phosphinylmercuric acetate in 25 ml. of water. The clear mixture was evaporated to about half its volume by heating with an infra-red lamp. After filtering out a small amount of free mercury, the liquid was further concentrated to give 1.9 g. (50.8% yield) of diethoxy-phosphonylmercuric chloride of M. P. 85–95° C. Twice recrystallized from water, the product had a melting point of 104–104.5° C.

The corresponding bromide, iodide and thiocyanate compounds were similarly prepared in yields of 74.2, 88.4 and 94%, respectively. The iodide and thiocyanate were insoluble in water and the crudes were accordingly collected by filtration.

A preferred method of preparing the phosphinylmercuric halides of the invention is illustrated by the preparations below. In this method the phosphonate is reacted with a mixture of mercuric oxide and mercuric halide.

EXAMPLE 4

A mixture of 8.3 g. (.05 mol) of di-n-propyl phosphonate, 5.4 g. (.025 mol) of mercuric oxide and 9 g. (.025 mol) of mercuric bromide in 50 ml. of dry benzene was refluxed for three hours, water as the azeotrope with benzene being continuously removed with a trap. Soon after the reflux period began, the orange mercuric oxide color changed to white. After cooling, 2.6 g. of inorganic material was filtered from the reaction mixture. Evaporation of the filtrate gave a syrup which crystallized readily upon the addition of petroleum ether.

The crude product of M. P. 67–68.5° C. was obtained in a yield of 14.8 g. (66.4%). Two recrystallizations from hot hexane gave pure di-n-propoxyphosphinylmercuric bromide of M. P. 70–70.4° C.

The dialkoxyphosphinylmercuric halides listed in the table below were also prepared by this direct procedure.

*Table*

| Compound | M. P., ° C. | Yield, Percent |
|---|---|---|
| diethoxyphosphinylmercuric chloride | 104–104.5 | 59.3 |
| di-n-propoxyphosphinylmercuric chloride | 80–81.5 | 61.4 |
| di-isopropoxyphosphinylmercuric chloride | 114.6–115.2 | 73.3 |
| di-n-butoxyphosphinylmercuric chloride | 91–92 | 27.4 |
| di-isobutoxyphosphinylmercuric chloride | 118.8–119.2 | 61.9 |
| diethoxyphosphinylmercuric bromide | 86–87 | 73.1 |
| di-n-butoxyphosphinylmercuric bromide | 78–78.4 | 43.9 |
| diethoxyphosphinylmercuric iodide | 102–102.5 | 61.0 |
| di-n-propoxyphosphinylmercuric iodide | 75.2–76 | 49.1 |
| di-n-butoxyphosphinylmercuric iodide | 56–57.2 | 41.9 |

With the exception of the diethoxy compounds, the halides listed in the above table are soluble in hot hexane. All of them are soluble in ordinary organic solvents.

Since the invention described herein may be variously practiced without departing from the spirit or scope thereof, it is to be understood that specific embodiments of the invention appearing in the above description are to be taken as illustrative and not limiting except as may be defined in the following claims.

What is claimed is:

1. A phosphinylmercuric salt of the general formula:

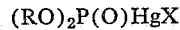

$$(RO)_2P(O)HgX$$

wherein R is selected from the group consisting of saturated aliphatic hydrocarbon, alkaryl and aralkyl radicals, and X is a member of the group consisting of alkylcarboxyl acid radicals having up to 8 carbon atoms and monovalent inorganic salt-forming radicals.

2. A dialkoxyphosphinylmercuric salt of an alkylcarboxylic acid having up to 8 carbon atoms.

3. A dialkoxyphosphinylmercuric salt of a monovalent inorganic anion.

4. A dialkoxyphosphinylmercuric acetate.

5. A dialkoxyphosphinylmercuric halide.

6. A dialkoxyphosphinylmercuric chloride.

7. A method of preparing a phosphorus-mercury compound which comprises reacting a phosphonate of the general formula:

$$(RO)_2P(O)H$$

wherein R is a radical of the group consisting of saturated aliphatic hydrocarbon, alkaryl and aralkyl radicals with a member of the group consisting of a mercuric salt of an alkylcarboxylic acid having up to 8 carbon atoms and mixtures of a mercuric salt of a monovalent inorganic anion with mercuric oxide in the presence of a liquid organic diluent which forms an azeotrope with a product of the reaction selected from the group consisting of an alkyl carboxylic acid having up to 8 carbon atoms and water.

8. Di-n-butoxyphosphinylmercuric chloride.

9. A method of preparing a phosphorus-mercury compound which comprises reacting a dialkyl phosphonate with a mercuric salt of an alkylcarboxylic acid having up to 8 carbon atoms in the presence of a liquid organic diluent which forms an azeotrope with the carboxylic acid formed in the reaction.

10. A method of preparing a phosphorus-mercury compound which comprises reacting a dialkyl phosphonate with mercuric acetate in the presence of a liquid organic diluent which is a solvent for at least one of the reactants and forms an azeotrope with the acetic acid formed in the reaction.

11. A method of preparing a phosphorus-mercury compound which comprises reacting a dialkyl phosphonate with a mixture of mercuric oxide and a mercuric halide in the presence of a liquid organic diluent which forms an azeotrope with the water formed in the reaction.

12. A method of preparing a phosphorus-mercury compound which comprises reacting a dialkyl phosphonate with an equimolar mixture of mercuric oxide and mercuric chloride in the presence of a liquid organic diluent which forms an azeotrope with the water formed in the reaction.

References Cited in the file of this patent

Evans et al.: Jour. of The Chem. Soc., pp. 1209–1239 (1940).

J. A. C. S., vol. 74, No. 16, Aug. 20, 1953, pp. 3967 to 3969.